(12) United States Patent
Amit et al.

(10) Patent No.: US 7,162,512 B1
(45) Date of Patent: Jan. 9, 2007

(54) GUARANTEED EXACTLY ONCE DELIVERY OF MESSAGES

(75) Inventors: Neta Amit, Haifa (IL); Alexander Frank, Ramat-Gan (IL); Yifat Peled, Haifa (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/514,460

(22) Filed: Feb. 28, 2000

(51) Int. Cl.
*G06F 13/00* (2006.01)

(52) U.S. Cl. ............... 709/206; 709/201; 709/204; 710/29; 710/54; 707/1

(58) Field of Classification Search ............. 709/201, 709/204, 206; 710/29, 54; 707/1
See application file for complete search history.

(56) References Cited

U.S. PATENT DOCUMENTS

| | | | |
|---|---|---|---|
| 4,644,542 A | | 2/1987 | Aghili et al. |
| 5,587,997 A | * | 12/1996 | Jacobson .............. 370/253 |
| 5,916,307 A | * | 6/1999 | Piskiel et al. ............. 709/314 |
| 6,058,389 A | * | 5/2000 | Chandra et al. ............ 709/102 |
| 6,094,694 A | * | 7/2000 | Hickson et al. ............. 710/54 |
| 6,137,864 A | * | 10/2000 | Yaker .................. 379/88.22 |
| 6,205,498 B1 | * | 3/2001 | Habusha et al. ............ 709/221 |
| 6,282,565 B1 | * | 8/2001 | Shaw et al. ............... 709/200 |
| 6,397,352 B1 | * | 5/2002 | Chandrasekaran et al. .. 709/201 |
| 6,401,136 B1 | * | 6/2002 | Britton et al. ............. 709/314 |
| 6,418,419 B1 | * | 7/2002 | Nieboer et al. ............. 705/37 |
| 6,484,196 B1 | * | 11/2002 | Maurille ................. 709/206 |
| 6,529,932 B1 | * | 3/2003 | Dadiomov et al. ......... 709/101 |
| 6,889,254 B1 | * | 5/2005 | Chandra et al. ............ 709/224 |
| 7,050,432 B1 | * | 5/2006 | Banavar et al. ............. 370/390 |
| 7,110,510 B1 | * | 9/2006 | Shaffer et al. ............ 379/88.25 |

FOREIGN PATENT DOCUMENTS

WO  WO 97/46939 A1  12/1997

OTHER PUBLICATIONS

Schmid et al., "SSCMP: the sequenced synchronized clock message protocol," *Computer Networks and ISDN Systems*, vol. 27, No. 12, pp. 1615-1632 (Nov. 1995).

* cited by examiner

*Primary Examiner*—David Wiley
*Assistant Examiner*—Alina Boutah
(74) *Attorney, Agent, or Firm*—Lee & Hayes, PLLC

(57) ABSTRACT

Guaranteed, exactly once delivery of messages is disclosed. In one embodiment, there is a sender and a receiver. In a sender transaction, the sender does the following: receives a message from a sender queue; generates a substantially unique identifier and an expiration time for the message; and, saves the identifier, the expiration time, and the message in a sender database. The sender then sends the identifier, the expiration time, and the message to the receiver. In a receiver transaction, the receiver then does the following: receives the identifier, the expiration time, and the message from a receiver queue; determines whether the message has expired based on the expiration time and determines whether the message is present in a receiver database by its identifier; and, upon determining that the message has not expired and is not present in the receiver database, stores the message in the receiver database, and performs actions associated with the message.

3 Claims, 3 Drawing Sheets

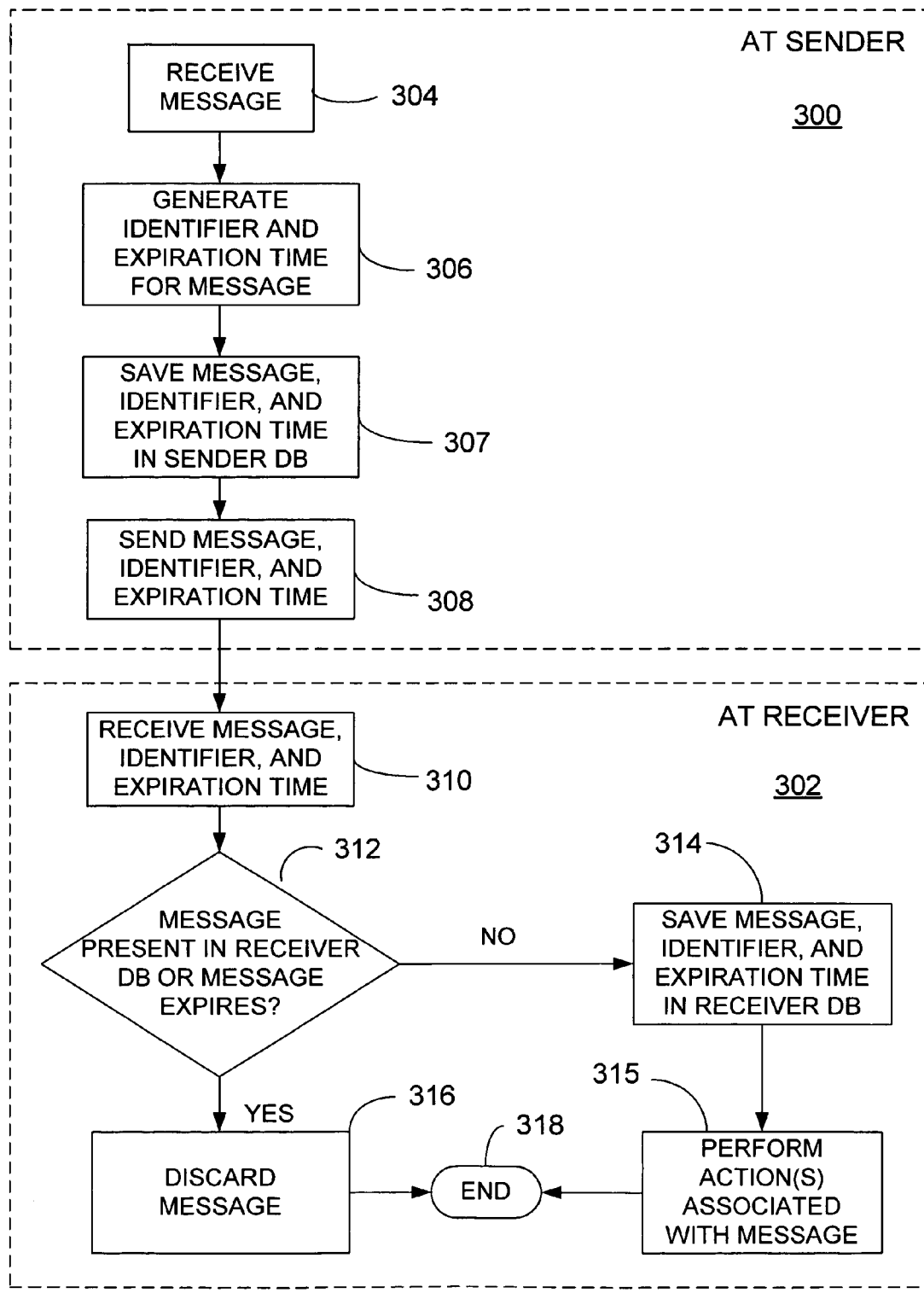

GUARANTEED EXACTLY ONCE DELIVERY OF MESSAGES

FIELD OF THE INVENTION

This invention relates generally to the delivery of messages, such as the delivery of messages within a message transaction system, and more particularly to the guaranteed, exactly once delivery of such messages.

BACKGROUND OF THE INVENTION

When organizations need to have large-scale computer systems that hold mission critical information, such as purchase orders, financial information, etc., they usually resort to message transaction systems. Message transaction systems ensure that data is not lost if the system crashes, and also that data is not duplicated—such as ensuring that two copies of the same purchase order are not processed, etc. A transaction is an activity or a request, such as an order, a purchase, a change, or an addition to a database of information. Transactions usually update one or more files on a non-volatile storage such as a hard disk drive, and thus can serve as both an audit trail and a history for future analyses. A transaction can include one or more messages. A transaction is considered committed when all the messages of the transaction have been received and processed.

For systems like message transaction systems, it is usually important that messages sent from a sender computer to a receiver computer are guaranteed to be delivered, and that they are delivered exactly once. For example, where a message relates to transfer money to a bank account, it is critical that the message is in fact delivered, so that trust can be placed in the system. Furthermore, it is critical that the message is delivered only once—so that the money is not transferred twice, etc. There can be pitfalls associated with guaranteed, exactly once delivery of messages. For example, the sender computer may crash, such that upon recovery it may not be known whether messages that were residing at the sender computer were sent or not.

Within the prior art, guaranteed exactly once delivery of messages is usually provided for by a transaction manager, or coordinator, within a transaction message system. The transaction manager is a bookkeeping program that keeps track of transactions, to ensure atomicity of transactions—that a given transaction completely executes or does not execute at all. Besides guaranteed exactly once delivery of messages, transaction managers also provide for in-order execution of transactional messages. This can result in significant processing overhead. Where only guaranteed exactly once message delivery is necessary—and not, for example, in-order execution of transactional messages—the performance penalty for using a transaction manager in such an instance can be prohibitive.

For these and other reasons, therefore, there is a need for the present invention.

SUMMARY OF THE INVENTION

The present invention relates to guaranteed, exactly once delivery of messages. In one embodiment, there is a sender and a receiver. In a sender transaction, the sender does the following: receives a message from a sender queue; generates a substantially unique identifier and an expiration time for the message; and, saves the identifier, the expiration time, and the message in a sender database. The sender then sends the identifier, the expiration time, and the message to the receiver. In a receiver transaction, the receiver then does the following: receives the identifier, the expiration time, and the message from a receiver queue; determines whether the message has expired based on the expiration time and determines whether the message is present in a receiver database by its identifier; and, upon determining that the message has not expired and is not present in the receiver database, saves the identifier, the expiration time, and the message in the receiver database, and performs actions associated with the message.

In another embodiment, the method also includes the following. The receiver sends an acknowledgment message from the receiver to the sender, corresponding to the original message. The sender, in a second sender transaction, receives the acknowledgement message and deletes the message in the sender database corresponding to the acknowledgement message.

Embodiments of the invention provide for advantages not found within the prior art. Because a transaction manager is not necessary, performance is increased as compared to prior art mechanisms that provide for exactly once delivery of messages. Regardless of if the sender crashes, upon recovery, the sender always sends the message to the receiver, providing for the guaranteed capability. Because the receiver checks the received message's identifier against a database, if it receives the same message twice, it ignores the message the second time, thus providing for the exactly-once capability. Thus, embodiments of the invention provide for guaranteed exactly once delivery of messages, but do not provide for in-order delivery as does the prior art. The messages sent from the sender to the receiver and vice-versa are desirably not transactional messages, since they are not provided for by a transaction manager. That is, they are non-transactional, express messages. With the use of express messages, it has been demonstrated that exactly once (guaranteed) delivery of messages can be achieved at a rate of several thousands of messages per second, as compared to only several hundreds of messages per second when using transactional messages as in the prior art.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
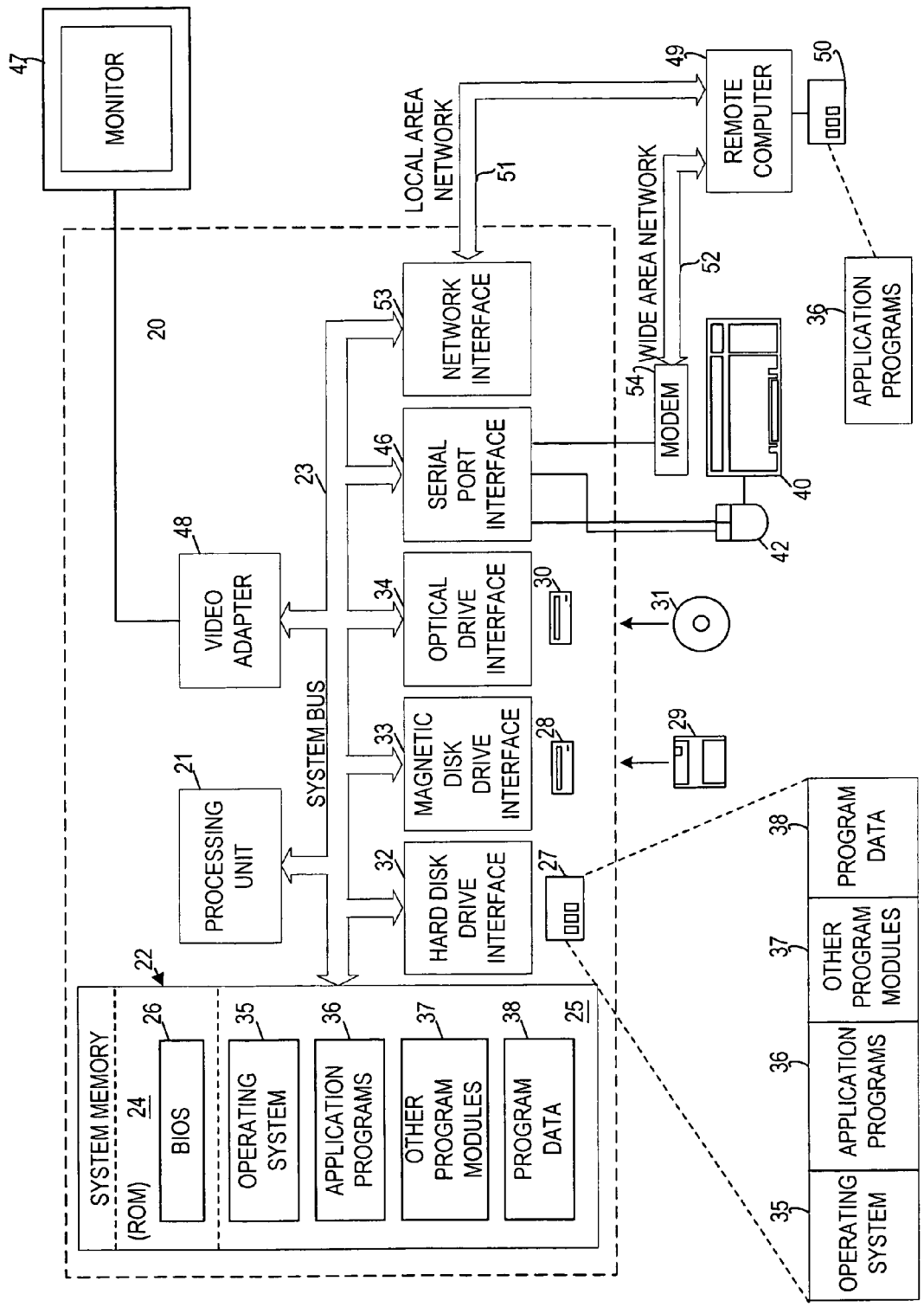
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Systems

In this section of the detailed description, systems according to varying embodiments of the invention are described. The systems are described in conjunction with FIG. 2, which is a diagram of a system according to an embodiment of the invention. The system 200 of FIG. 2 includes a network 201, a sender 202, and a receiver 204. The network 201 can be any type of public, private, or combination public-private network or networks, such as the Internet, a local-area network (LAN), a wide-area network (WAN), an intranet, an extranet, or combinations thereof, as can be appreciated by those of ordinary skill within the art.

Each of the sender 202 and the receiver 204 in one embodiment is a computer, such as that described in the previous section of the detailed description. Each includes a message queue, a computer program, and a database. Specifically, the sender 202 has a queue 208, a program 206, and a database 210, while the receiver 204 has a queue 209, a program 207, and a database 211. The computer program is in one embodiment executed by a processor from a computer-readable medium, such as a memory or a hard disk drive, which are not particularly shown in FIG. 2. The message queue is the queue from which messages are received by the sender 202 and the receiver 204. A queue generally is defined as a storage space in memory or on disk that holds incoming transmissions until the computer can process them. The database can be any type of database, where a database generally is defined as a set of related files that is created and subsequently managed.

In accordance with embodiments of the invention, the sender 202 sends a message to the receiver 204 over the network 201 such that the message is delivered in a guaranteed, exactly once manner. To provide this capability, the program 206 of the sender 202 receives a message from the queue 208, and stores and/or looks up information regarding the message in the database 210 before sending the message over the network 201 to the receiver 204. The message is received at the queue 209 of the receiver 204, from which the program 207 receives the message, and also stores and/or looks up information regarding the message in the database 211. The receiver 204 may perform one or more actions associated with the message. Ultimately, the information regarding the message is deleted from each of the database 210 and the database 211.

Figure 2:
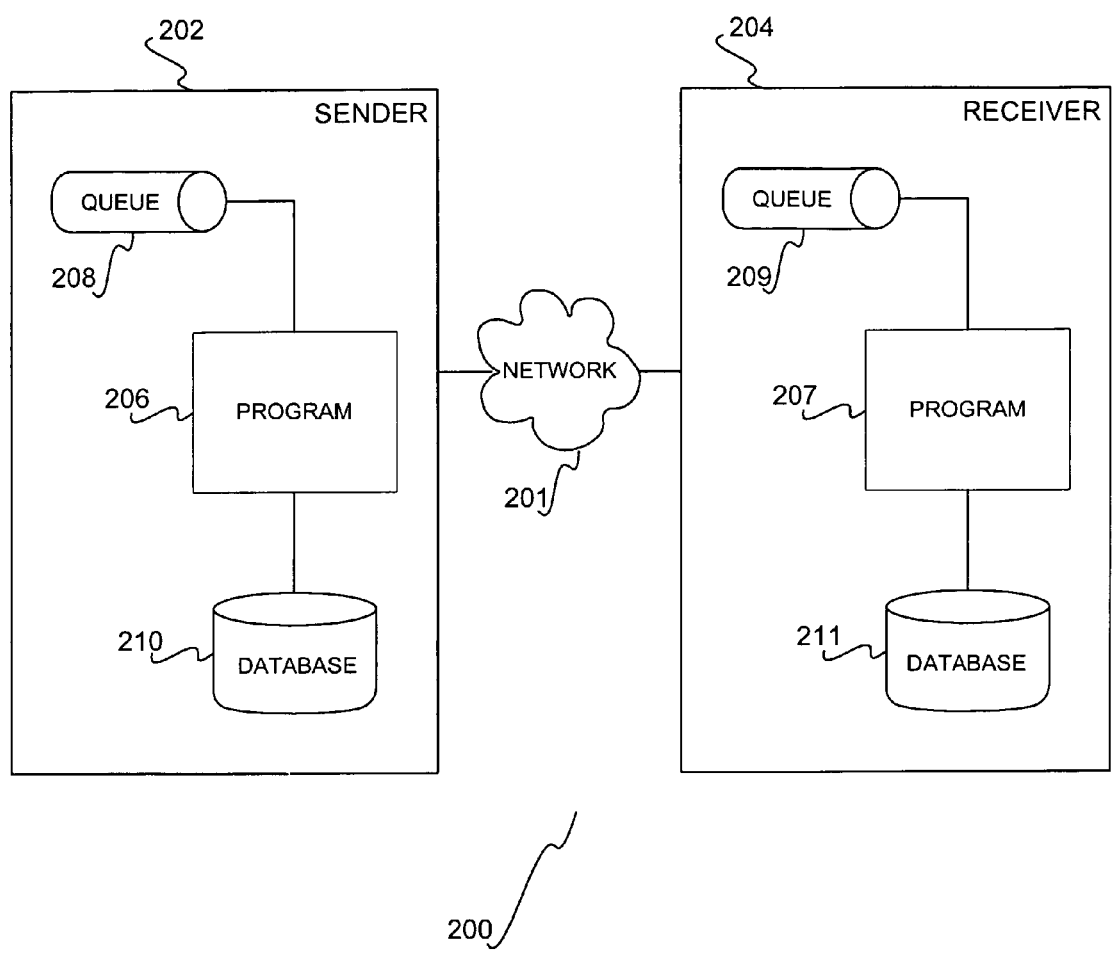
FIG. 2 is a diagram of a system according to an embodiment of the invention; and, FIG. 3 is a flowchart of a method according to an embodiment of the invention.

The specific manner by which the guaranteed, exactly once delivery of messages within the system 200 of FIG. 2 is described in the next section of the detailed description, which specifically presents methods according to varying embodiments of the invention.

Methods

In this section of the detailed description, methods according to varying embodiments of the invention are described. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer. The methods can be implemented in conjunction with the system of FIG. 2 described in the previous section of the detailed description, although those of ordinary skill within the art can appreciate that the invention itself is not so limited.

Referring to FIG. 3, a flowchart of a method according to an embodiment of the invention is shown. The method includes two parts, a first part 300 performed at the sender, and a second part 302 performed at the receiver. It is noted that each of the first part 300 and the second part 302 can in themselves be separate methods, performed by the sender and the receiver, respectively. The first part 300 includes 304, 306 307, and 308, while the second part includes 310, 312, 314, 315, 316 and 318.

The sender performs 304, 306 and 307 in one sender transaction (importantly, it is noted that 304, 306, and 307 should be performed in a single transaction). In 304, the sender receives a message from a sender queue. In 306, the sender generates an identifier and an expiration time for the message, and the identifier, the expiration time and the message itself are saved in a sender database in 307. The identifier is to uniquely identify the message as compared to other messages that are to be or have been sent to the receiver. The identifier is substantially unique in that over time, the identifiers can be repeated. In one embodiment, the identifier is a globally unique identifier (GUID), as known within the art.

The expiration time is the time after which the message expires. The guaranteed nature of message delivery provided by embodiments of the invention is such that desirably it is assumed that the sender, if it crashes, is able to recover within a time period less than the least amount of time that the expiration time can be set to. Thus, when the message expires, then it is known that the message has in fact been sent from the sender to the receiver. In one embodiment, the expiration time is referred to as a time-to-live (TTL) value, as known within the art.

Finally, in 308, the message, the identifier, and the expiration time are sent from the sender to the receiver.

The receiver performs 310, 312, 314, 315, and 316 in a receiver transaction. In 310, the message along with the identifier and the expiration time sent by the sender are received from a receiver queue at the receiver.

In 312, the receiver determines whether the message is already present in a receiver database, by the identifier of the message, and whether the message has expired, based on its expiration time. Thus, if the identifier for the message is already in the receiver database, then this means that the receiver has previously received this message. If the message is already present in the receiver database, or message has already expired, then the method proceeds to 316, where the message is discarded in one embodiment and the method is finished in 318.

Otherwise, the method proceeds to 314, where the receiver saves the message, the identifier, or the expiration time, and in 315, the receiver then performs one or more actions associated with the message and the method is finished in 318. For example, if the message relates to deducting an amount of money from a bank account, then this action is referred to as being associated with the message, such that the action is performed. It is noted that the invention is not particularly limited to a given type or number of actions that can be associated with a message received by the receiver, except that it must be possible to abort such actions and roll-back their side-effects, if any. That is, the action or actions must all be controlled by a resource manager, such that it should be possible to abort an action without generating any side effects.

Not shown in the method of FIG. 3 is that the receiver may subsequently send an acknowledgement message from the receiver to the sender, that corresponds to the message. In such an embodiment, in a second sender transaction, the sender receives this acknowledgment message, and based thereon, deletes the message in the sender database corresponding to the acknowledgment message, including the identifier and the expiration time for the message. It is noted, however, that the acknowledgement-message sent by the receiver and the subsequent deletion of the original message from the sender database is not necessary to the invention. The sender's scavenger thread will delete the message anyway after it expires. However, the earlier message deletion does provide a slight scalability gain. Furthermore, the sender can process the acknowledgment message differently. First, it peeks the message, that is, non-destructively copy the message from the message queue; second, it deletes the message from the sender database; and, third, it destructively deletes the message from the message queue—for example, via a destructive "receive" of the message from the queue. This is done in 3 separate transactions. Each transaction involves a single Resource Manager (Queue, Database, Queue), so a transaction coordinator does not participate in the operation. Performance-wise, this can be a significant saving.

The message sent by the sender and the acknowledgement message sent by the receiver are desirably non-transactional, also referred to as express messages. An express message is a non-recoverable message in that it cannot be recovered following a computer crash.

Furthermore, in one embodiment of the invention, a scavenger process or thread is periodically run at both the sender and the receiver, which reviews the messages stored in the database, and deletes any it finds that have expired—that is, messages for which their expiration time has been reached (viz., reached or exceeded). This is performed to provide for scalability, as can be appreciated by those of ordinary skill within the art.

As has been previously noted, the method of FIG. 3 can in one embodiment be performed by the system of FIG. 2 described in the previous section of the detailed description. In such an embodiment, the computer program of the sender can be considered the means for accomplishing the sender's functionality. Furthermore, the computer program of the receiver can be considered the means for accomplishing the receiver's functionality.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method for a sender to guarantee an exactly once delivery of a message to a receiver, the method comprising:
   associating an expiration time with the message;
   associating an identifier with the message;
   storing the message in association with the expiration time and with the identifier;
   sending to the receiver the message in association with the expiration time and with the identifier; and
   upon reaching the expiration time, if the message has not yet been deleted, then deleting the message along with the identifier and the expiration time associated with the message, the deleting being performed by a scavenger thread at the sender.

2. The method of claim 1 further comprising:
   receiving from the receiver an acknowledgement of receipt of the message; and
   deleting the message along with the identifier and the expiration time associated with the message.

3. A computer-readable medium having instructions for performing a method for a sender to guarantee an exactly once delivery of a message to a receiver, the method comprising:
   associating an expiration time with the message;
   associating an identifier with the message;
   storing the message in association with the expiration time and with the identifier;
   sending to the receiver the message in association with the expiration time and with the identifier; and
   upon reaching the expiration time, if the message has not yet been deleted, then deleting the message along with the identifier and the expiration time associated with the message, the deleting being performed by a scavenger thread at the sender.

* * * * *